June 16, 1925.
D. P. OWENS
TRACTOR CHAIN
Filed July 19, 1924
1,542,715
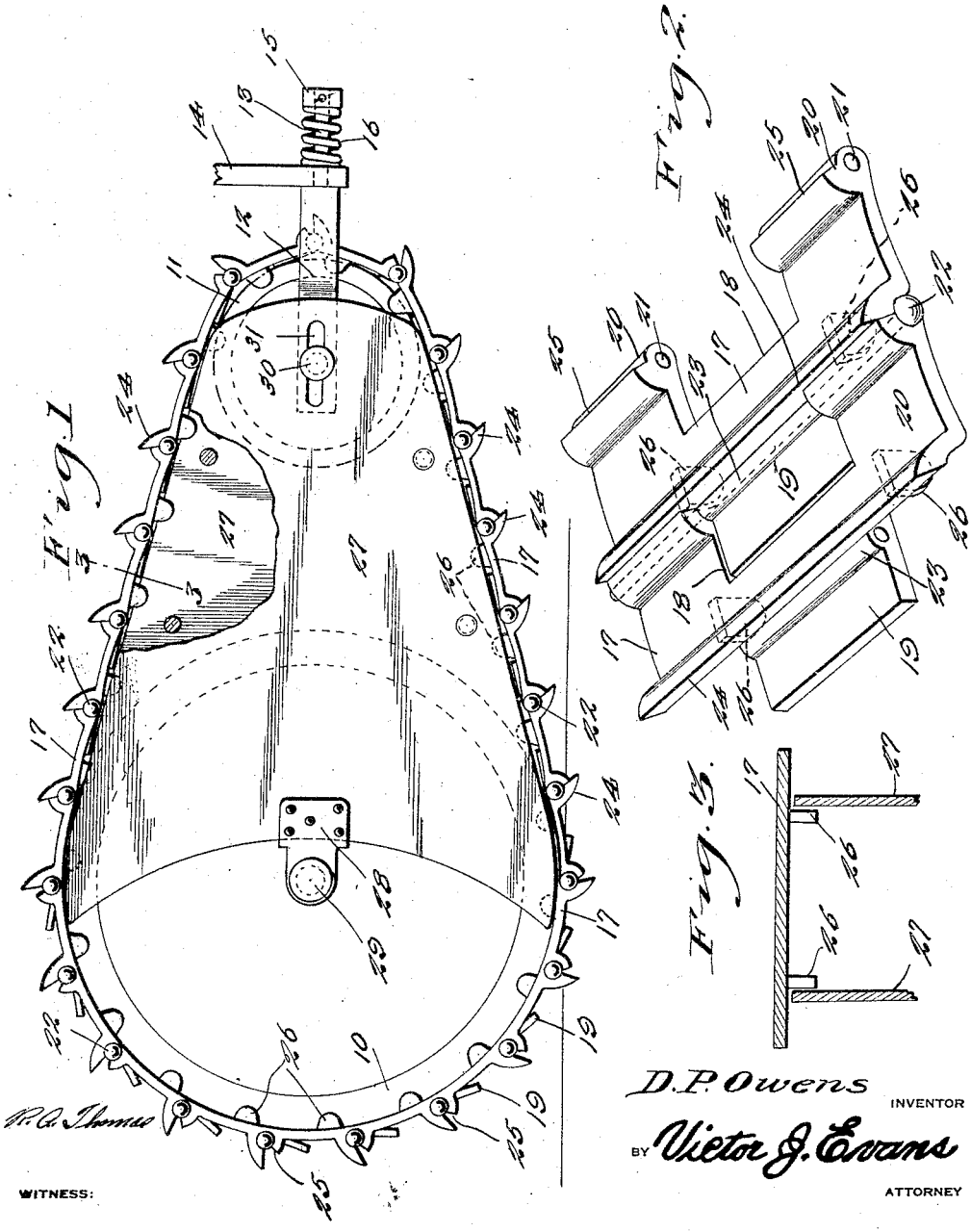
D. P. Owens
INVENTOR
BY Victor J. Evans
ATTORNEY
WITNESS:

Patented June 16, 1925.

1,542,715

UNITED STATES PATENT OFFICE.

DABNEY P. OWENS, OF LAKE WORTH, FLORIDA.

TRACTOR CHAIN.

Application filed July 19, 1924. Serial No. 727,062.

*To all whom it may concern:*

Be it known that I, DABNEY P. OWENS, a citizen of the United States, residing at Lake Worth, in the county of Palm Beach and State of Florida, have invented new and useful Improvements in Tractor Chains, of which the following is a specification.

This invention relates to tractor chains, and contemplates a structure wherein the links of the chain are designed to effectively engage the ground to promote traction especially in soft or muddy surfaces, and are also designed to prevent dirt or other foreign matter from accumulating about the working parts of the chain.

Another object of the invention resides in providing a chain of the class above mentioned, wherein each link of the chain is provided with means to embrace the tread of the tractor wheel to prevent the chain from sliding or moving laterally from said wheel under any circumstance.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a view showing how the chain is trained over the tractor wheel and idler.

Figure 2 is an outer plan view of two connected links of the chain.

Figure 3 is a sectional view taken on line 3—3 of Figure 1.

Referring to the drawings in detail 10 represents a tractor wheel with which the tractor chain is adapted for use, and as shown in Figure 1 this chain is adapted to be trained over the wheel 10 and also over an idler 11. The idler is journaled in a suitable bracket 12 which includes a rod like portion 13 which slides through an opening formed in a hanger 14 and equipped with a nut 15. Encircling the rod like portion 13 is a coil spring 16 which has one end bearing against the hanger 14 and its other end engaging the nut 15, the spring being tensioned to hold the bracket 12 in contact with the hanger, and thus maintain the idler 11 in a position to hold the chain taut. In addition to this fact, the construction provides a sort of a swivel joint between the bracket 12 and the hanger 14, thus allowing the bracket to turn slightly within the hanger under certain conditions.

The chain is made up of a plurality of identically constructed links which are arranged side by side and connected together in the manner shown in Figure 2. Each link includes a body portion 17 which is formed at one side with an opening or recess 18, while projecting from the other side of the link is a tongue 19. That side of the link provided with the opening 18 is thickened as at 20, the thickened portions being arranged at the opposite side of the opening and is formed with bores 21 to receive a pivot bolt 22 which serves to hingedly connect the adjacent links together. The other side of the link is formed with a thickened portion 23 of a length equal to the width of the tongue 19, the thickened portion 23 being provided with a bore adapted to be arranged in a line with the bores 21 of the thickened portions 20 to also receive the pivot bolt 22 in the manner illustrated in Figure 2. When the links are connected together, the tongue 19 of one link is positioned within the opening 18 of the adjacent link, and as the thickened portion 23 is arranged on top of said tongue, it is also positioned within the thickened portions 20 for the purpose just mentioned. In addition to the characteristic features above described, each link is formed with a curved edge 24 which is arranged to permit the chain to obtain a good purchase on soft or muddy territory to thus promote traction, and at the same time cooperate with the shoulders 25 formed on the thickened portions 20 of the adjacent link to limit the pivotal movement of the adjacent links in one direction. In other words by reason of this construction the chain cannot break inwardly at its pivotal points when arranged to contact or engage the ground or surface to promote traction. It will be noted upon an inspection of Figures 1 and 2 that all of these curved edge portions 24 project an appreciable distance beyond the shoulders 25 with which they cooperate, so that as the chain passes over the ground, the curved edge portions tend to prevent dirt and the like from accumulating within the pivotal joints of the chain or in other words between the curved edges 24 and the shoulders 25. When the chain is brought into contact with the ground or surface, the curved edges 24 remain in contacting engagement with the adjacent shoulders 25, both of which features are used to obtain a proper purchase upon the soft ground or territory to prevent slipping of the wheel, and promote traction. However it will be noted upon inspection of Figure 1 that after the links pass over the ground beneath the wheel 10, the chain is broken at each of its pivotal points, to force the tongues 19 out of the openings 18, and thus free the links adjacent their pivotal points of sand, dirt or other foreign matter which would otherwise collect about the pivotal points, and ultimately become hardened and thus impair the efficiency of the chain as a whole. When the working links approach the ground and come in contact therewith beneath the wheel 10, the tongues 19 are wholly positioned within the openings 18 of the adjacent links and lie in the same plane therewith, until each pair of links engages that portion of the wheel which causes the links to break at their pivotal point. Of course while I have shown each link provided with a single opening 18, and a single tongue 19, I desire to have it known that the links may vary in these respects without departing from the spirit of the invention.

It will be further noted that each link is formed with a pair of spaced parallel lugs 26 arranged to embrace the wheel 10 as the chain passes about the wheel to prevent the chain from moving laterally off the wheel while in use.

If found necessary mud guards may also be employed to prevent mud or the like from finding its way into the space between the wheel 10 and the idler 11, and when use of these guards are desired, the guards are arranged at opposite sides of the wheel as shown in Figures 1 and 3, wherein the guards are indicated at 27. The guards are arranged on the outside of the lugs 26 immediately beneath the links and close the entire space between the upper and lower runs of the chain, as well as the space between the wheel 10 and the idler 11. The rear end of each guard is attached to a bracket 28 which is mounted upon the axle 29 of the wheel 10, while the forward end of each guard is supported by the axle 30 of the idler 11 which axle passes through a slot 31 formed in said guard as shown in Figure 1. These slots 31 permits the idler to be moved against the tension of the spring 17 toward or away from the wheel 10 under certain conditions and circumstances when the chain is in use.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

1. A tractor chain comprising a plurality of links arranged side by side and pivotally connected together, each link having an opening at one side thereof and a tongue projecting from the opposite side and received by the opening of the adjacent link, said tongue being forced from said opening as the chain is flexed at its pivotal points to prevent dirt and other foreign matter from accumulating about the chain, and cooperating means carried by the adjacent links to limit the pivotal movement thereof in one direction.

2. A tractor chain comprising a plurality of identically constructed links arranged side by side, each link having an opening at one side, a tongue projecting from the opposite side and adapted to be received by said opening of the adjacent link, each link having thickened portions adjacent the edges thereof, said thickened portions having bores therethrough with the bores of the adjacent links arranged in alignment when said links are associated, a pivot pin passed through said bores for pivotally connecting the adjacent links together at a point whereby said tongues are forced from said openings when the chain is flexed, a curved edge projecting from one side of each link directly adjacent the tongue thereof and cooperating with the said thickened portions of the adjacent link to provide means for effectively engaging the ground to promote traction, and to also limit the pivotal movements of said links in one direction, and spaced parallel lugs carried by each link and arranged to embrace the tractor wheel to prevent casual separation of the chain therefrom while the chain is in use.

In testimony whereof I affix my signature.

DABNEY P. OWENS.